US010178683B2

(12) United States Patent
Desai et al.

(10) Patent No.: US 10,178,683 B2
(45) Date of Patent: Jan. 8, 2019

(54) SYSTEMS AND METHODS FOR ENABLING COEXISTENCE OF MULTIPLE WIRELESS COMPONENTS OPERATING IN THE SAME FREQUENCY BAND

(71) Applicant: Avago Technologies International Sales Pte. Limited, Singapore (SG)

(72) Inventors: Prasanna Desai, Olivenhain, CA (US); Kelly Coffey, Los Gatos, CA (US); Robert Hulvey, Redondo Beach, CA (US); Mark Gonikberg, Los Altos Hills, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 0 days.

(21) Appl. No.: 15/410,254

(22) Filed: Jan. 19, 2017

(65) Prior Publication Data

US 2017/0135123 A1 May 11, 2017

Related U.S. Application Data

(63) Continuation of application No. 14/047,564, filed on Oct. 7, 2013, now Pat. No. 9,565,548, which is a (Continued)

(51) Int. Cl.
*H04B 7/00* (2006.01)
*H04B 15/00* (2006.01)
(Continued)

(52) U.S. Cl.
CPC ... *H04W 72/1215* (2013.01); *H04W 72/1242* (2013.01); *H04W 88/06* (2013.01)

(58) Field of Classification Search
CPC ... H04W 56/00; H04W 52/281; H04W 12/06; H04W 8/245; H04W 88/06;
(Continued)

(56) References Cited

U.S. PATENT DOCUMENTS 5,495,190 A 2/1996 Abe et al.
5,752,193 A 5/1998 Scholefield et al.
(Continued)

FOREIGN PATENT DOCUMENTS

CN 1194083 A 9/1998
CN 1614926 A 5/2005
(Continued)

OTHER PUBLICATIONS

English Abstract for Chinese publication No. CN1614926A published May 11, 2005, 1 pg.
(Continued)

*Primary Examiner* — Shaima Q Aminzay
(74) *Attorney, Agent, or Firm* — Sterne, Kessler, Goldstein & Fox PLLC

(57) ABSTRACT

Methods and systems for enabling coexistence of multiple potentially interfering wireless components in a device are provided. A device may include a wireless module using a proprietary protocol and one or more modules using standardized protocols. The device further includes a coexistence arbitration module configured to arbitrate access to a shared communication medium among the wireless modules based on assertion of medium access requests by the modules and the associated priority of the asserted medium access requests. When multiple medium access requests have the same priority, precedence for access to the shared medium is determined based on additional criteria. The coexistence arbitration module may be a separate module or may be integrated into another module or distributed among the modules. The device may include a host processor for altering transmission characteristics of a module to increase the likelihood that another module can receive data within a reasonable time period.

12 Claims, 8 Drawing Sheets

Related U.S. Application Data continuation of application No. 11/838,682, filed on Aug. 14, 2007, now Pat. No. 8,554,270.

(60) Provisional application No. 60/822,615, filed on Aug. 16, 2006.

(51) Int. Cl.
*H04W 72/12* (2009.01)
*H04W 88/06* (2009.01)

(58) Field of Classification Search
CPC ......... H04W 72/1215; H04W 72/1242; H04W 80/04; H04W 8/04; H04W 80/00; H04W 74/0891
USPC ............ 455/76.11, 435.3, 450, 452.1, 452.2, 455/553.1, 556.2, 558, 502, 13.2; 370/329, 345, 346, 304
See application file for complete search history.

(56) References Cited

U.S. PATENT DOCUMENTS

| | | |
|---|---|---|
| 7,453,844 B1 | 11/2008 | Lee et al. |
| 7,778,226 B2 | 8/2010 | Rayzman et al. |
| 8,554,270 B2 | 10/2013 | Desai et al. |
| 2004/0048577 A1 | 3/2004 | Godfrey et al. |
| 2004/0071154 A1 | 4/2004 | Wentink |
| 2005/0271010 A1* | 12/2005 | Capretta ........... H04W 72/1215 370/329 |
| 2006/0034199 A1 | 2/2006 | Chu et al. |
| 2006/0072735 A1 | 4/2006 | Shell et al. |
| 2008/0102885 A1 | 5/2008 | Tu et al. |
| 2008/0285536 A1 | 11/2008 | Kaidar et al. |
| 2009/0063740 A1 | 3/2009 | Yeh et al. |
| 2011/0009060 A1 | 1/2011 | Hsu et al. |
| 2014/0040471 A1 | 2/2014 | Desai et al. |

FOREIGN PATENT DOCUMENTS

| | | |
|---|---|---|
| EP | 1 387 593 A2 | 2/2004 |
| EP | 1 388 951 A2 | 2/2004 |
| EP | 1 583 295 A2 | 10/2005 |
| EP | 1 605 643 A1 | 12/2005 |
| EP | 1 626 533 A1 | 2/2006 |

OTHER PUBLICATIONS

European Search Report for Application No. 07016134.4-2412 / 1890431, dated Sep. 17, 2010, 9 pages.

* cited by examiner

600

| | WLAN MODULE | | BT MODULE | | EXT. RADIO | | |
|---|---|---|---|---|---|---|---|
| | Assert | Priority | Assert | Priority | Assert | Priority | |
| NORMAL 610 | X | X | X | X | Yes | High | External Radio |
| | No | -- | Yes | X | No | -- | BT Module |
| | Yes | Low | Yes | High | No | -- | BT Module |
| | Yes | X | No | -- | No | -- | WLAN Module |
| | Yes | High | Yes | Low | No | -- | WLAN Module |
| | Yes | High | Yes | High | No | -- | Arbitration Algorithm |
| | Yes | Low | Yes | Low | No | -- | Arbitration Algorithm |
| DISCOVERY 620 | X | X | X | X | Yes | High | External Radio |
| 630 | No | -- | No | -- | Yes | Low | External Radio |
| 650a | Yes | Low | Yes | High | Yes | Low | BT Module |
| 650b | No | -- | Yes | High | Yes | Low | BT Module |
| 640a | No | -- | Yes | Low | Yes | Low | Arbitration Algorithm |
| 650c | Yes | High | Yes | Low | Yes | Low | WLAN Module |
| 650d | Yes | High | No | -- | Yes | Low | WLAN Module |
| 640b | Yes | Low | No | -- | Yes | Low | Arbitration Algorithm |
| 660 | Yes | High | Yes | High | Yes | Low | Arbitration Algorithm |
| 640c | Yes | Low | Yes | Low | Yes | Low | Arbitration Algorithm |

FIG. 6

SYSTEMS AND METHODS FOR ENABLING COEXISTENCE OF MULTIPLE WIRELESS COMPONENTS OPERATING IN THE SAME FREQUENCY BAND

CROSS-REFERENCE TO RELATED APPLICATIONS

This application is a continuation of U.S. patent application Ser. No. 14/047,564, filed Oct. 7, 2013, which claims the benefit of U.S. patent application Ser. No. 11/838,682, filed Aug. 14, 2007, assigned U.S. Pat. No. 8,554,270, which claims the benefit of U.S. Provisional Application No. 60/822,615, filed Aug. 16, 2006, all of which are herein incorporated by reference in their entireties.

FIELD OF THE INVENTION

The present invention relates to wireless multimedia platforms, and more specifically to arbitration among wireless modules for access to a medium.

BACKGROUND

The use of various wireless technologies has become widespread. Wireless Personal Area Networks (WPANs), such as those using Bluetooth technology, provide mechanisms for wirelessly connecting peripheral devices and mobile devices over short distances. Wireless Local Area Networks (WPANs) provide mechanisms for mobile devices to wireless connect to a network (e.g., a local area network (LAN)) over longer distances. Many WLAN systems are based on the IEEE 802.11 WLAN standards. Additionally, many devices (e.g., wireless radios) may communicate using proprietary wireless protocols.

In many instances, a single user device may incorporate multiple wireless technologies. For example, Bluetooth technology may be used to couple a device to a headset, WLAN technology may be used to connect the device to a network (e.g., the Internet), and a proprietary wireless radio technology may be used to gather data from external sensors. One or more of these technologies may operate in the same or in interfering frequency bands. Thus, when these modules are included in the same device, many types of interference may occur. Additionally, the device may require the multiple wireless modules to share access to the same transmission and/or reception media (such as an antenna).

One technique used to enable coexistence of multiple components in a device is to separate the transmission of each in the frequency domain. However, these frequency division multiplexing techniques are not effective in small form factor devices. In these devices, the receivers become desensitized by strong signals in separate channels. Other techniques based on collaborative mechanisms such as described in IEEE 802.15.2-2002 Recommended Practice for Information Technology—Part 15.2: Coexistence of Wireless Personal Area Networks with Other Wireless Devices Operating in the Unlicensed Frequency Bands, are also used. However, these techniques primarily address coexistence between WLAN and BT devices not coexistence between WLAN and/or BT devices and devices using proprietary wireless protocols or other standards. Additionally, these collaborative techniques may introduce inefficiencies in transmission or require additional hardware resources.

Therefore, what is needed are systems and methods for efficiently arbitrating among multiple wireless components within a wireless device.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 6 provides a table of precedence during discovery mode of operation, according to embodiments of the present invention.

Figure 7:
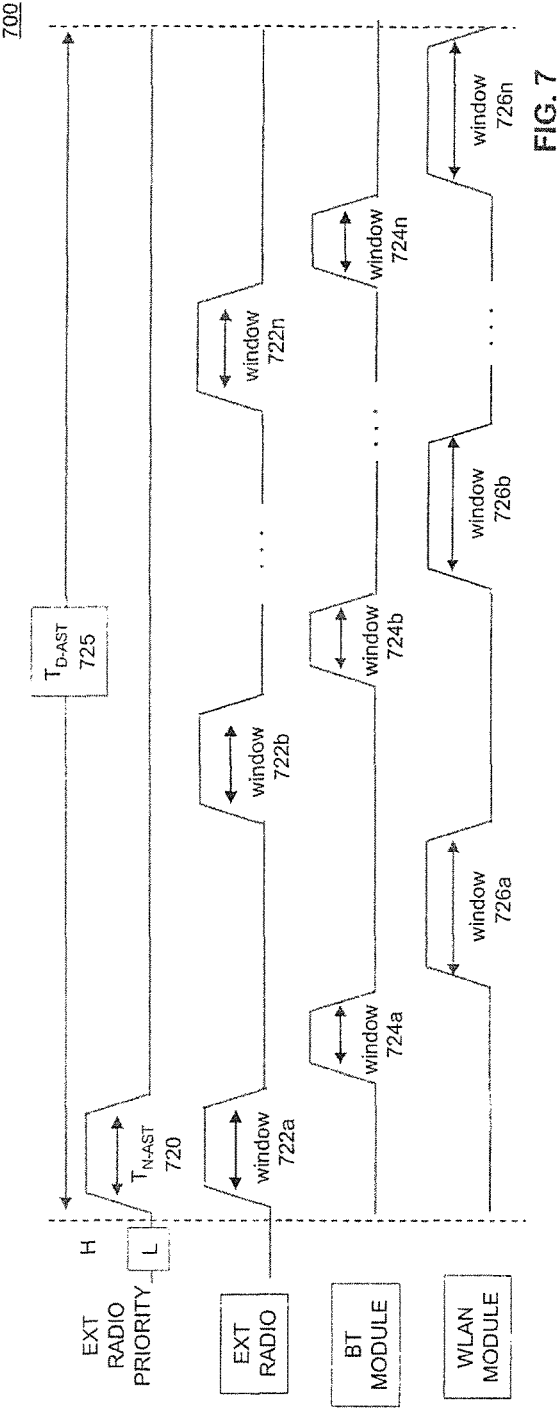

FIG. 7 is a timing diagram 700 which illustrates the transmission and receive windows for external radio module 242c and WLAN and BT modules 242a,b during discovery mode of operation, according to embodiments of the present invention.

Figure 8:
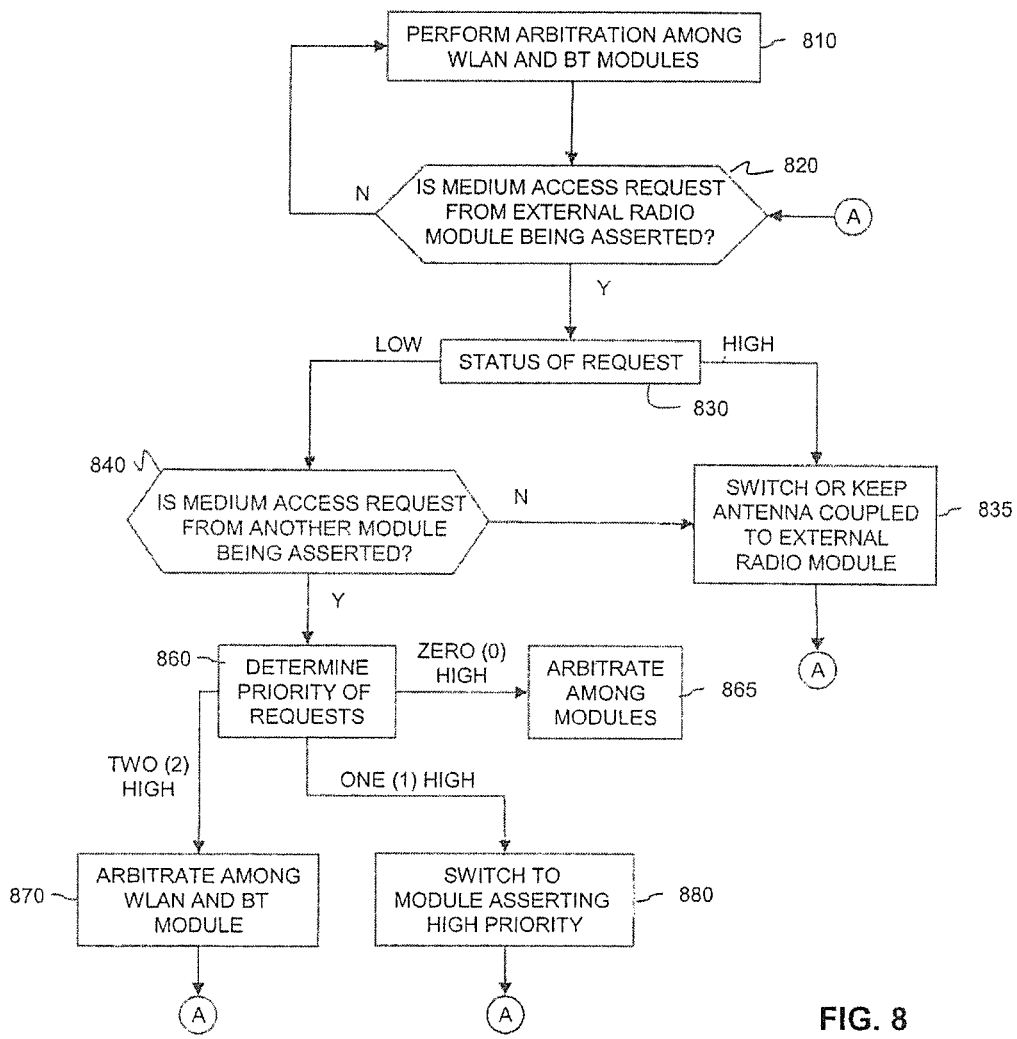

FIG. 8 depicts a flowchart of a method for coexistence arbitration among multiple wireless modules from the perspective of coexistence arbitration module, according to embodiments of the present invention.

Figure 9:
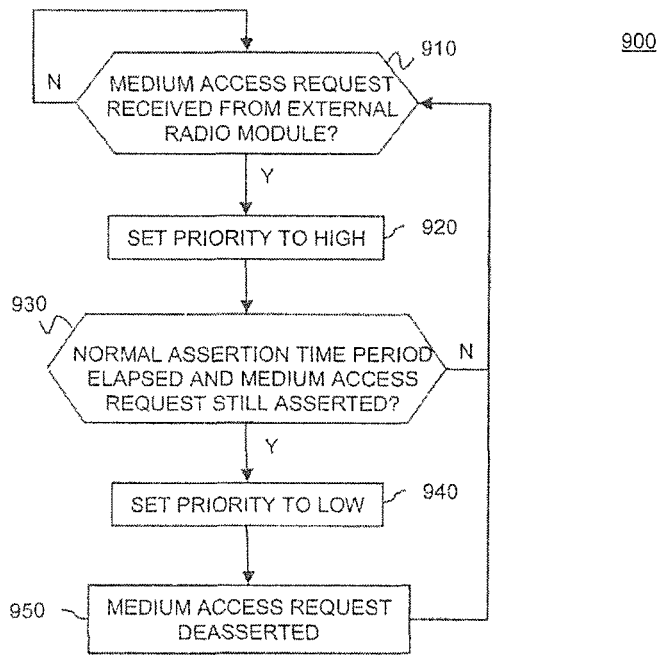

FIG. 9 depicts a flowchart of a method for coexistence arbitration among multiple wireless modules from the perspective of status determination module, according to embodiments of the present invention.

Figure 10:
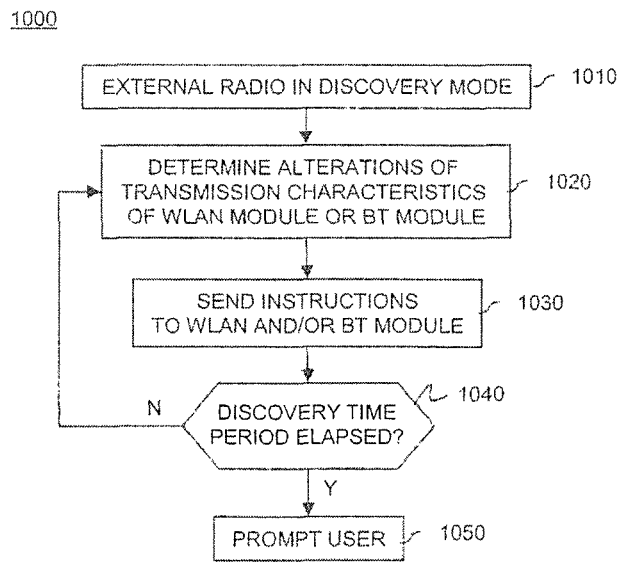

FIG. 10 depicts a flowchart of a method for coexistence arbitration among multiple wireless modules from the perspective of the host, according to embodiments of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

Figure 1:
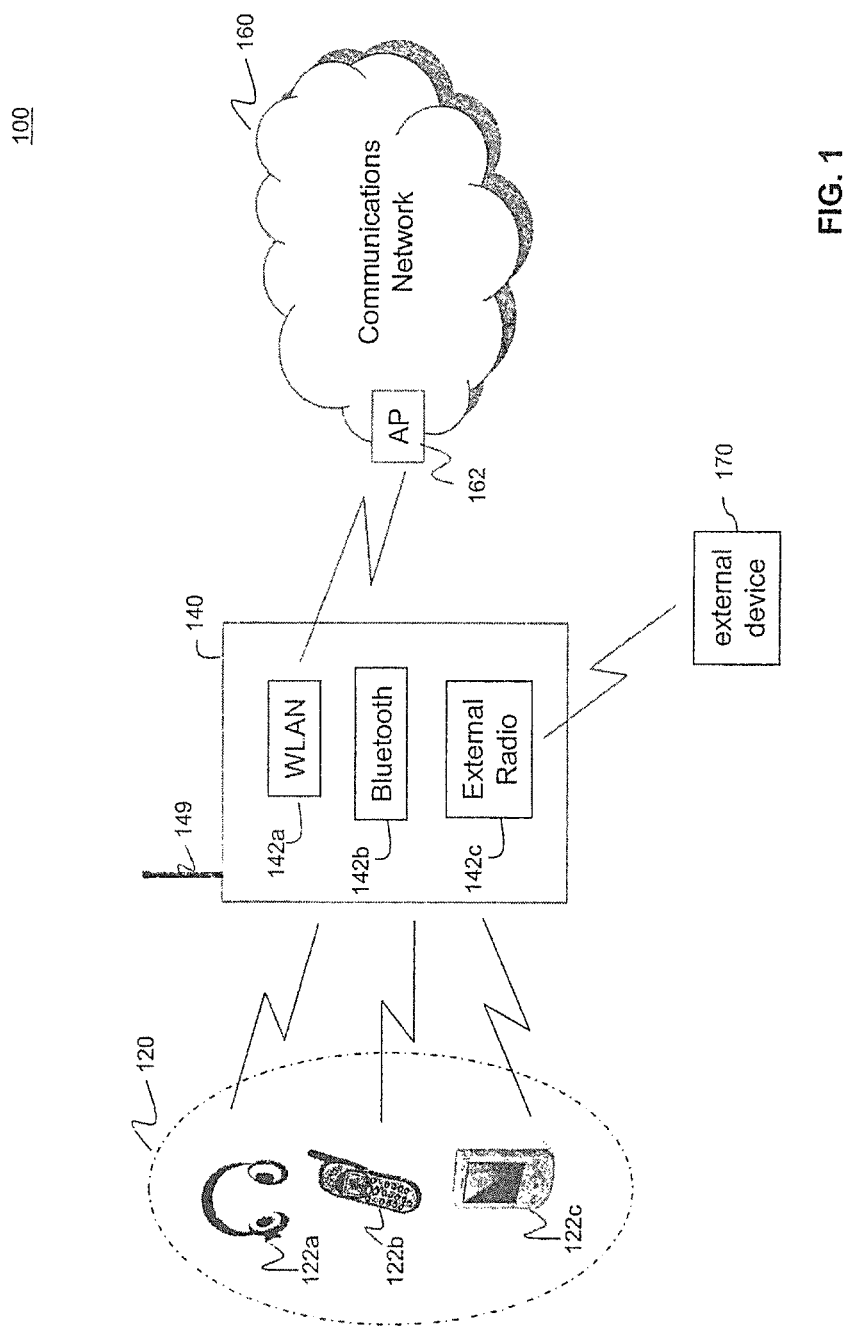
FIG. 1 is a block diagram of an exemplary system having a station that supports the coexistence of multiple potentially interfering wireless modules, according to embodiments of the present invention.

FIG. 1 is a block diagram of an exemplary system 100 having a station or terminal 140 that supports the coexistence of multiple potentially interfering modules, according to embodiments of the present invention. Station or terminal 140 (referred to herein as "station 140") includes multiple wireless modules 142a-c that operate in the same frequency band or in interfering frequency bands. For example, wireless module 142a may be a wireless local area network (WLAN) module (e.g., using a WLAN protocol such as based IEEE 802.11 standards), wireless module 142b may be a wireless personal area network (WPAN) device (e.g., based on Bluetooth protocol), and wireless module 142c may be a wireless radio device based on a proprietary wireless protocol. As would be appreciated by persons of skill in the art, additional or alternative wireless modules could be included in station 140. For ease of discussion, wireless module 142a is referred to herein as WLAN module; wireless module 142b is referred to herein as Bluetooth (BT) module; and wireless module 142c is referred to herein as external radio module.

WLAN module 142a is configured to allow station 140 to communicate with communications network 160 via one or more access points (AP) 162. WLAN module 142a may receive and/or transmit voice, audio, or data content from or to communications network 160 via AP 162. Communications network 160 may be a public or private data communications network, a wireless network, the public switched telephone network (PSTN), or any combination thereof. For example, a portion of communications network 160 may be a WLAN infrastructure network.

BT module 142b communicates with one or more peripheral devices 120 via a WPAN protocol such as Bluetooth. Peripheral devices 120 may include a wireless headset 122a, a wireless or cordless phone 122b, and/or a personal digital assistant 122c. As would be appreciated by persons of skill in the art, other types of peripheral devices could be supported by system 100. BT module 142b may transmit or receive voice, audio, or data to or from peripheral devices 120. For example, BT module 142b may transmit audio content to a wireless headset 122a.

External radio module 142c is configured to communicate with one or more external devices 170. In an embodiment, external device 170 is a sensor configured to periodically transmit data to wireless module 142c. For example, the sensor may be coupled to an object (e.g., athletic equipment), a shoe, or other apparel. The sensor may transmit data collected such as foot fall, speed, etc. to external radio module 142c for use by one or more applications within station 140. In an embodiment, external device 170 is configured to operate according to a proprietary wireless standard and to transmit data at a certain bit rate (e.g., 256 bits every second). External device 170 may be further configured to transmit at a single frequency. As would be appreciated by persons of skill in the art, other types of external radios and external devices can be used with the present invention.

Wireless station 140 also includes one or more antennas 149. In an embodiment, multiple wireless modules 142a-c share a single antenna. Alternatively, wireless modules 142a-c may use different antennas. However, because the wireless modules operate at the same or interfering frequencies, simultaneous communication by multiple wireless modules will likely interfere. Therefore, wireless station 140 includes a mechanism for arbitrating among wireless modules 142a-c.

Figure 2:
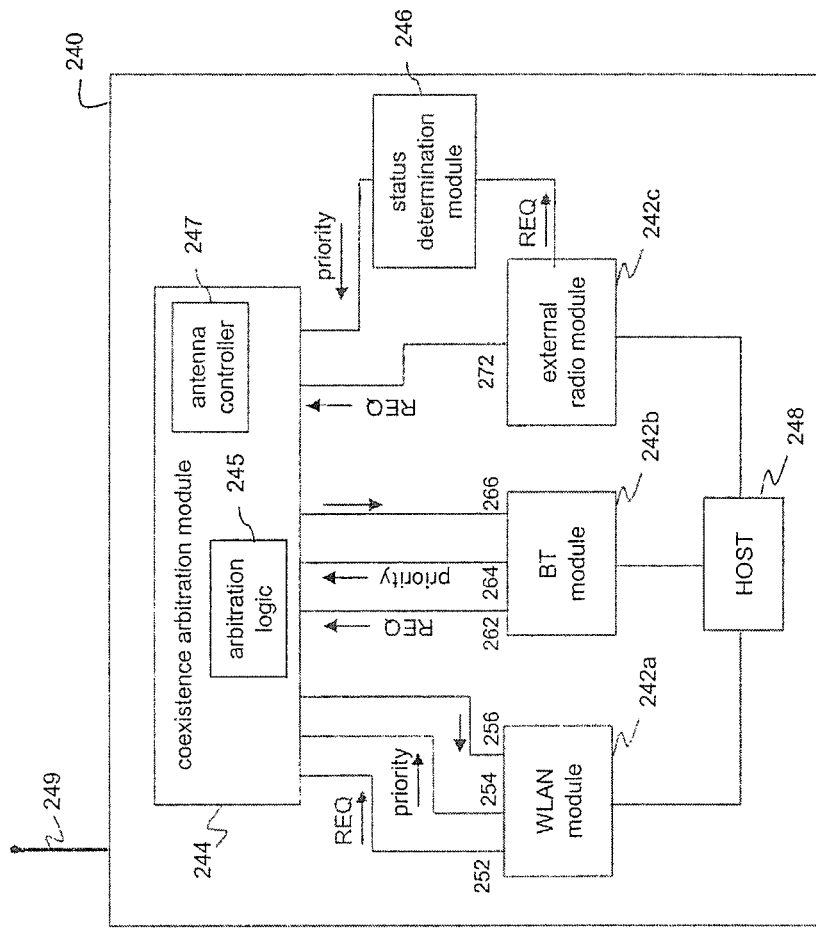
FIG. 2 is a block diagram of a station that supports the coexistence of multiple potentially interfering wireless modules, according to embodiments of the present invention.

FIG. 2 is a block diagram of a station 240 that supports the coexistence of multiple potentially interfering wireless modules, according to embodiments of the present invention. Station 240 includes a coexistence arbitration module 244, WLAN module 242a, BT module 242b, external radio module 242c, a status determination module 246, and a host 248.

When external radio module 242c and one or more other wireless modules (WLAN module 242a and/or BT module 242b) are operating concurrently, station 240 has two modes of operation, normal mode and discovery mode. In normal mode of operation, external radio module 242c periodically asserts a request for access to antenna 249 in order to receive data from external device 170. While in the normal mode of operation, external radio module 242c generally has precedence over the WLAN module 242a and Bluetooth module 242b for reception and/or transmission. Normal mode of operation is described in further detail below.

In discovery mode of operation, external radio module 242c attempts to synchronize with external device 170. The discovery mode of operation may be initiated when external radio module 242c is activated or when data is not received from an external device for a predetermined period of time during normal operation. While in discovery mode of operation, external radio module 242c asserts a request for access to the station antenna for an extended time period. Coexistence arbitration module 244 determines which wireless module has precedence based on available information such as the priority of each medium access request being asserted. Discovery mode of operation is described in further detail below.

WLAN module 242a is coupled to coexistence arbitration module 244 and host 248. The interface between WLAN module 242a and coexistence arbitration module 244 may be compliant with a standard such as the IEEE 802.15.2 standard. In an embodiment, WLAN module 242a includes a port 252 for transmitting (or asserting) a medium access request to coexistence arbitration module 244, a port 254 for transmitting (or asserting) a priority signal to coexistence arbitration module 244, and a port 256 for receiving a medium confirm from coexistence arbitration module 244. Alternatively, WLAN module 242a may include a port for transmitting (or asserting) both the medium access request and priority and a port for receiving the medium confirm. In a further alternative embodiment, WLAN module 242a includes a single port supporting all three messages/signals.

In general, a medium access request is transmitted (or asserted) when a module requires access to antenna 249. A priority message indicates the importance to be assigned to the medium access request. For example, WLAN module may assert a medium access request with a HIGH priority, indicating that the WLAN module 242a has limited tolerance for waiting to access the medium. WLAN module 242a may also assert a medium access request with a LOW priority, indicating a greater tolerance for waiting to access the medium. The medium confirm indicates to the wireless module that access to the medium has been confirmed by the coexistence arbitration module 244.

BT module 242b is coupled to coexistence arbitration module 244 and host 248. The interface between BT module 242b and coexistence arbitration module 244 may also be compliant with a standard such as the IEEE 802.13.2 standard. In an embodiment, BT module 242b includes a port 262 for transmitting (or asserting) a medium access request to coexistence arbitration module 244, a port 264 for transmitting (or asserting) a priority signal to coexistence arbitration module 244, and a port 266 for receiving a medium confirm from coexistence arbitration module 244. Alternatively, BT module 242b may include a port for transmitting (or asserting) both the medium access request and priority and a port for receiving the medium confirm. In a further alternative embodiment, BT module 242b includes a single port supporting all three messages/signals.

WLAN module 242a and BT module 242b are further configured to receive instructions from host 248. For example, when the system is operating in a discovery mode of operation, host 248 may instruct WLAN module 242a and/or BT module 242b to suppress medium access requests to increase the window available for receipt of signals from an external device 170 by external radio module 242c. Alternatively, host 248 may alter the transmission characteristics of WLAN module 242a and/or BT module 242b to limit the amount of data sent by the module(s). This reduction of data improves the chances for the external device 170 to synchronize with external radio module 242c.

External radio module 242c is coupled to coexistence arbitration module 244, status determination module 246, and optionally host 248. In an embodiment, external radio module 242c supports a proprietary wireless radio standard. For example, external radio module 242c may support a unidirectional protocol. External radio module 242c may also be configured to only receive transmissions from external devices. In this embodiment, wireless module 142c has a lower tolerance to loss than WLAN module 142a or BT module 142b.

External radio module 242b includes one or more ports for communicating with other modules. For example, external radio module may include a port 272 for transmitting (or asserting) a medium access request to coexistence arbitration module 244. External radio module 242b may also transmit (or assert) the medium access request to status determination module 246 via port 272 or a separate port.

In an embodiment, external radio module 242b does not use a dedicated medium access request. In this embodiment, the signals used to activate the external radio are used as the medium access request. For example, the power_up signal for the receiver and/or the power_up signal for the transmitter may be used as the medium access request.

Status determination module 246 is configured to determine the priority of a medium access request made by the external radio 242c. Status determination module 248 determines the status of the medium access request based on the duration of the medium access request. For example, status module 248 sets the priority of the request to HIGH during a first time period. If the medium access request remains asserted longer than the first time period, status determination module 246 changes the priority of the request to LOW. As illustrated in FIG. 2, status determination module 246 is a separate circuit or software module. Alternatively, status determination module 246 may be included in WLAN module 242a, BT module 242b, or host processor 248. In an embodiment, status determination module 246 is a timer.

Coexistence arbitration module 244 is configured to arbitrate among WLAN module 242a, BT module 242b, and external radio module 242c for access to a shared station medium such as antenna 249. Coexistence arbitration module 244 includes arbitration logic 245 and an optional antenna controller 247. Arbitration logic 245 determines which module 242 has precedence for use of a shared station medium. Arbitration logic 245 uses available information such as the priority of received medium access requests and optionally historical data related to recent use of the medium to make the precedence determination. For example, when external radio module 242c asserts a medium access request with a HIGH priority, the external radio module 242c is given precedence. If only one module asserts a medium access request having a HIGH priority, that module is given precedence. Arbitration logic 245 may include additional logic for arbitrating among multiple modules asserting a medium access request having the same priority. In an embodiment, this logic can be dynamically programmed Coexistence arbitration module 244 has multiple ports for receiving medium access requests from WLAN module 242a, BT module 242b, and external radio module 242c and priority signals from WLAN module 242a and BT module 242b. Coexistence arbitration module 244 may also include ports for transmitting medium confirm signals to WLAN module 242a and BT module 242b. For example, as illustrated in FIG. 2, coexistence arbitration module 244 may include 8 ports for communicating with wireless modules 242a-c. In alternate embodiments, coexistence arbitration module 244 may have fewer ports for communication with wireless modules 242a-c.

Antenna controller 247 is configured to couple antenna 249 to one of the wireless modules 242a-c. For example, if coexistence arbitration module 244 determines that external radio module 242c has precedence for communication, antenna controller 245 couples antenna 249 to external radio module 242c.

Although illustrated as a separate module in FIG. 2, coexistence arbitration module 244 may also be included in WLAN module 242a or BT module 242b. Alternatively, the functionality of coexistence arbitration module 244 may be distributed among WLAN module 242a, BT module 242b, and/or host 248. Additionally, WLAN module 242a, BT module 242b, and optionally coexistence arbitration module 244 may be included on a single chip.

Host 248 includes one or more applications for station 240. Host 248 may include an application that uses data received from external device 170 via external radio module 242c. For example, an application may be a fitness program measuring data sensed by an external device attached to a shoe (e.g., foot fall). Additionally, host 248 may have applications using data transmitted to or from WLAN module 242a and/or BT module 242b.

Figure 3:
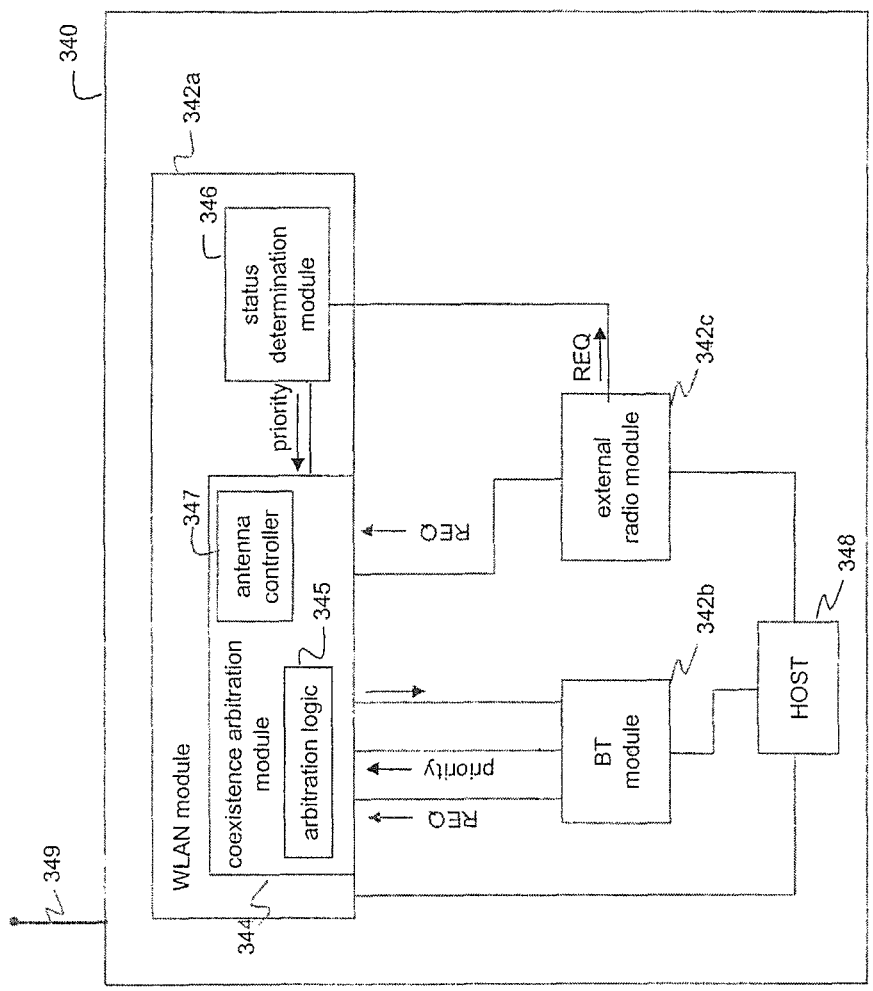
FIG. 3 is a block diagram of an alternate embodiment of a station that supports the coexistence of multiple potentially interfering wireless modules, according to embodiments of the present invention.

FIG. 3 is a block diagram of an alternate embodiment of a station 340 that supports the coexistence of multiple potentially interfering wireless modules, according to embodiments of the present invention. Station 340 includes a WLAN module 342a, a BT module 342b, and external radio module 342c. In the embodiment of FIG. 3, coexistence arbitration module 344 and status determination module 345 are included in WLAN module 342a. BT module 342b, external radio module 342c, coexistence arbitration module 344, and host 348 are described above in reference to FIG. 2.

WLAN module 342a is coupled to BT module 342b, external radio module 342c, status determination module 346, and host 348. WLAN module 342a is configured to receive medium access requests from BT module 342b and external radio module 342c and priority signals from BT module 342b and status determination module 346. WLAN module 342a provides its own medium access requests and priority to coexistence arbitration module 344 via internal hardware and/or software logic.

Status determination module 346 receives medium access requests from external radio module 342c and provides priority data associated with the request to coexistence arbitration module 344 via internal hardware and software logic. The operation of status determination module 346 is described above in reference to FIG. 2.

Figure 4:
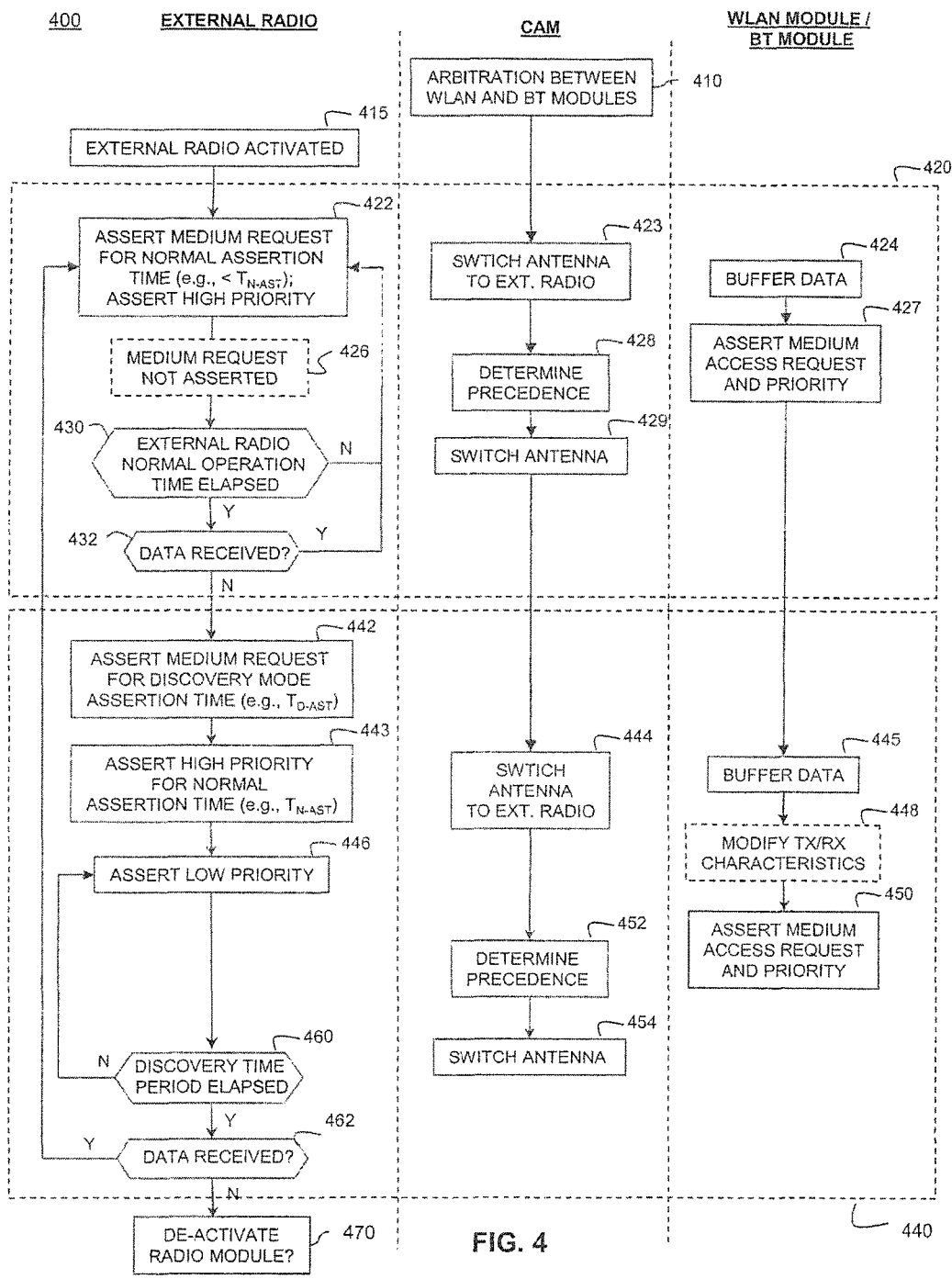
FIG. 4 depicts a flowchart of a method for coexistence arbitration among multiple wireless modules, according to embodiments of the present invention.

FIG. 4 depicts a flowchart 400 of a method for coexistence arbitration among multiple wireless modules, according to embodiments of the present invention. Flowchart 400 describes the high level operation of external radio module 242c, coexistence arbitration module 244, and WLAN and BT modules 242a,b during arbitration processing. Flowchart 400 is described with continued reference to the embodiments of FIGS. 1 and 2. However, flowchart 400 is not limited to those embodiments. The steps of flowchart 400 do not necessarily have to occur in the order shown.

In step 410, coexistence arbitration module 244 arbitrates between activated wireless modules (e.g., WLAN module 242a and BT module 242b) using arbitration logic 245. Note that if only one module is activated, no arbitration is necessary. At this point in flowchart 400, only WLAN module 242a and/or BT module 242b are activated.

In step 415, external radio module 242c is activated. As part of the activation step, system 200 may perform discovery operations to attempt to synchronize external radio module 242c with external device 170. Discovery operation is described below in step 440.

In step 420, station 240 enters normal operation mode. Step 420 includes steps 422-432. Normal operation mode can logically be thought of as having multiple intervals, each having a predetermined time period, $T_{N-OP}$ (e.g., 1 sec). Certain processing by the coexistence arbitration module 244, WLAN module 242a, BT module 242b, and external radio module 242c occurs during each interval. For example, steps 422-429 may occur in each interval.

In step 422, external radio module 242c asserts a medium access request for the normal assertion time period, $T_{N-AST}$ (e.g., 10 ms). During time period $T_{N-AST}$, a HIGH priority signal is also asserted by status determination module 246.

In step 423, upon receipt of a medium access request from external radio module 242c having a HIGH priority, antenna controller 247 switches antenna 249 to external radio module 242c. External radio module 242c can then receive and/or transmit data. The time period during which a module has access to antenna 249 is referred to herein as the "transmission and/or reception window." Access to antenna 249 by WLAN module 242a and BT module 242b is blocked for the duration of normal assertion time period, $T_{N-AST}$.

In step 424, while external radio module 242c is coupled to antenna 249, BT module 242b and/or WLAN module 242a may buffer data for later transmission. The WLAN module 242a and BT module 242b can buffer a certain amount of data without any disruptions to an application (e.g., audio player). In the example of the BT module 242b, no interruption of the audio stream will occur provided that the receiving device (e.g., wireless headset) has a jitter buffer larger than the normal assertion time period, $T_{N-AST}$.

In step 426, external radio module 242c ceases assertion of the medium access request for the remainder of the operational interval, $T_{REM}$.

In step 427, BT module 242b and/or WLAN module 242a may assert or continue assertion of a medium access request and an associated priority signal. Note that WLAN module 242a and/or BT module 242b may assert a medium access request at any time during normal operation, including coincidentally with assertion of a medium access request by external radio module 242c.

In step 428, coexistence arbitration module 244 arbitrates among the remaining modules asserting a medium access request. During step 428, arbitration logic 245 determines which wireless module has precedence based on available data such as the priority of the medium access request, transmission requirements of the module, and optionally historical use of the medium. For example, BT module 242b and WLAN module 242a may both be asserting a HIGH priority signal in step 427. However, because BT module 242b has limited data buffering capacity, arbitration logic 245 may give BT module 242b precedence for transmission and/or reception. FIG. 6 provides a table of precedence determinations based on medium access request assertion and the value of the associated priority signal. When multiple modules assert a medium access request having the same priority, arbitration logic 245 may use criteria in addition to the medium access request priority to determine precedence.

In step 429, antenna controller 247 switches antenna 249 to the wireless module with the highest precedence.

WLAN module 242a and BT module 242b may assert and de-assert a medium access request and change the priority of asserted requests as needed throughout the remainder of an operational interval. Arbitration logic 245 determines precedence for antenna based on this changing input data. Accordingly, steps 427, 428, and 429 may be repeated during the remainder of the interval, $T_{REM}$. For example, after BT module 242b completes use of medium (e.g., transmission of data), BT module 242b may de-assert the medium access request or change the priority of the request to LOW.

In step 430, a determination is made whether a predetermined time period for normal operation, $T_{N-OP}$, has elapsed. For example, system 200 may set a time period (e.g., 5 seconds) for normal operation. If the time period for normal operation, $T_{N-OP}$, has not elapsed, operation returns to step 422 where another operational interval is initiated. If the time period for normal operation, $T_{N-OP}$, has elapsed, operation proceeds to step 432.

In step 432, a determination is made whether data has been received from an external device 170 during the time period for normal operation (e.g., 5 seconds). Failure to receive data from the external device 170 may indicate that the external device is not activated or is not properly synchronized with external radio module 242c. If data has been received from external device 170, normal operation is continued and processing returns to step 422. If data has not been received from external device, discovery mode is initiated and processing proceeds to step 440.

Figure 5:
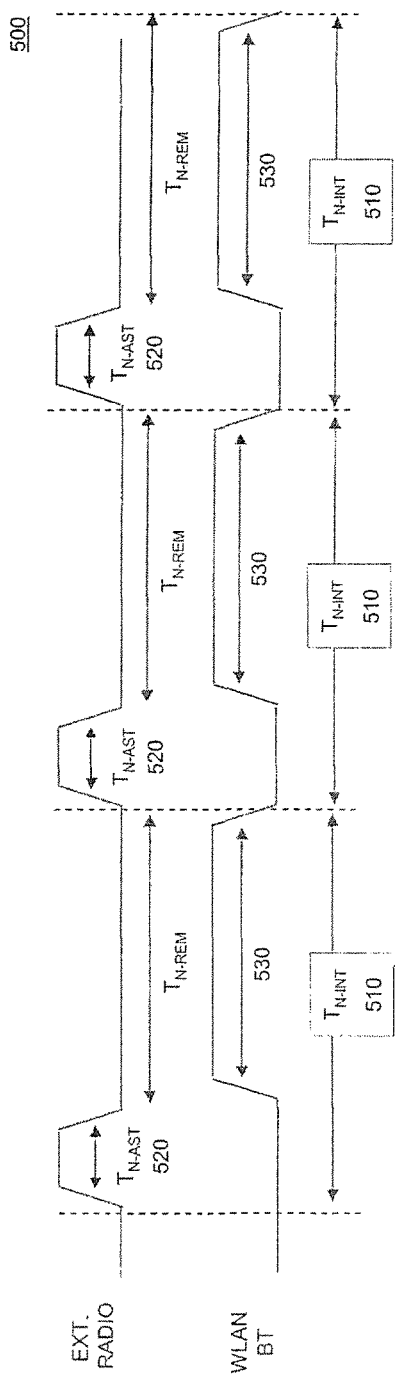
FIG. 5 is a timing diagram that illustrates the transmission and reception windows for external radio module and WLAN and BT modules during a normal mode of operation, according to embodiments of the present invention.

FIG. 5 is a timing diagram 500 which illustrates the transmission and reception windows for external radio module 242c and WLAN and BT modules 242a,b during normal mode of operation, according to embodiments of the present invention. As illustrated in FIG. 5, normal operation mode can be viewed as having a series of intervals 510, each having a duration of $T_{N-INT}$ (e.g., 1 second). During each interval 510, a medium access request having HIGH priority is asserted by the external radio module 242c for a normal assertion time period, $T_{N-AST}$ 520. During this normal assertion period 520, antenna 249 is coupled to external radio module 242c which can then receive or transmit data. The WLAN/BT transmission/receive 530 window represents the time period between external radio module receive windows 520 when either the WLAN module 242a or BT module 242b can transmit or receive data. Normal mode of operation continues as long as data from an external device 170 is received by system 200.

In step 440, discovery operation is performed. Step 440 includes steps 442-460. During discovery mode, the external radio 242c requests access to the medium for an extended time period. Unlike normal mode, the access of external radio 242c to the medium may be interrupted by WLAN module 242a and/or BT module transactions.

In step 442, a medium access request is asserted by external radio module 242c for the discovery mode assertion time period, $T_{D-AST}$. Discovery mode assertion time period is longer than normal assertion time period, $T_{N\text{-}AST}$. For example, discovery mode assertion time period may be set to 120 seconds.

In step 443, during the normal assertion time period, $T_{N\text{-}AST}$, of the discovery mode assertion time period, a HIGH priority signal is asserted for external radio module 242c. For example, a HIGH priority signal is asserted for 10 ms of the 120 second discovery mode assertion time period.

In step 444, upon receipt of a medium access request from external radio module 242c having a HIGH priority, antenna controller 247 switches the antenna 249 to external radio module 242c. External radio module 242c can receive and/or transmit data.

In step 445, while external radio module 242c is coupled to antenna 249, BT module 242b and/or WLAN module 242a may buffer data for later transmission.

In step 446, after the normal assertion time period, $T_{N\text{-}AST}$, has elapsed, status determination module 246 asserts a LOW priority signal for the remainder of the discovery assertion time period.

In step 448, the transmission characteristics for the WLAN module 242a and/or BT module 242b may be modified to increase the likelihood that external device 170 can synchronize with external radio module 242c during discovery operation. Step 448 is optional. For example, host 248 may receive the access requests asserted by modules 242a-c and the priority signals asserted by modules 242a-b and status determination module 246. Based on these inputs, host 248 identifies that the system is in discovery mode. Alternatively, host 248 may also receive data from external device 170. If host 248 stops receiving this data for a certain time period, host 248 recognizes that the system is in discovery mode. Upon recognizing that the system is in discovery mode, host 248 then determines whether to change the transmission characteristics of the WLAN module 242a and/or BT module 242b.

In an embodiment, host 248 causes a reduction in the amount of data sent over the WLAN and/or BT interfaces. In response, WLAN and/or BT modules modify the assertion of medium access requests and priorities in accordance with the revised transmission characteristics. For example, the voice quality of the BT link may be degraded to reduce the amount of data sent over the BT connection. The host may also throttle the data throughput of the WLAN and/or BT module. In a further example, the host causes some transactions to be delayed and/or completely stopped. In this example, host 248 may send an instruction to the WLAN module 242a or BT module 242b to cause the module to cease assertion of a medium access request for a certain time period. Host 248 may continue to adjust the transmission characteristics of the modules throughout the duration of discovery operation. In a further example, the bitpool parameter of the Bluetooth sub band codec (SBC) may be dynamically reduced to increase the gaps between Bluetooth transmission slots.

In step 450, BT module 242b and/or WLAN module 242a may assert or continue assertion of a medium access request and associated priority signals.

In step 452, coexistence arbitration module 244 arbitrates among the remaining modules asserting a medium access request. During step 452, arbitration logic 245 determines which wireless module has precedence based on available data such as the priority associated with each medium access request, transmission requirements of the module, and optionally historical use of the medium. FIG. 6 provides a table of precedence during discovery mode of operation, according to embodiments of the present invention. When only one module asserts a HIGH priority, the module is given precedence for the antenna. When two or more modules assert a medium access request having the same priority (e.g., all LOW), arbitration logic 245 may use additional criteria to determine precedence.

In step 454, antenna controller 247 switches antenna 249 to the wireless module with the highest precedence.

WLAN module 242a and BT module 242b may assert and de-assert a medium access request and change the priority of asserted requests as needed throughout the remainder of the discovery operation. Arbitration logic 245 determines precedence for antenna based on this changing input data. Accordingly, steps 446 and 450-454 may be repeated during the remainder of discovery operation.

FIG. 7 is a timing diagram 700 which illustrates the transmission and receive windows for external radio module 242c and WLAN and BT modules 242a,b during discovery mode of operation, according to embodiments of the present invention. As illustrated in FIG. 7, during discovery operation, the medium access request from external radio module 242c has a HIGH priority 704 for the normal assertion time period, $T_{N\text{-}AST}$. During this time period, external radio module 242c has access to the antenna 249 and can receive or transmit data (transmission/reception window). After the normal assertion time period has elapsed, the priority of the external radio module medium access request is switched to LOW 708. For the remainder of the discovery operation time period, access to the antenna 249 is arbitrated by arbitration logic 245. FIG. 7 illustrates an example of transmission and receive windows for the duration of the discovery operation. In this example, BT module 242b is next given access to the antenna for window 724a. During window 724a, BT module 242b may transmit or receive data. WLAN module 242a then gains access to the antenna for window 726a. During this window, WLAN module 242a may transmit or receive data. Finally, external radio module 242c is again given access to the antenna for window 722b. As described above, the duration, order, and/or occurrence of transmission and reception windows 722b-n, 724a-n, and 726a-n may be altered by host 248 to increase the chances of receiving data from external device 170 within the discovery time period.

In step 460, a determination is made whether the discovery time assertion period, $T_{D\text{-}AST}$ has elapsed. If the discovery time period has not elapsed, processing returns to step 446 where the LOW priority signal continues to be asserted. If the discovery time period has elapsed, processing proceeds to step 462.

In step 462, a determination is made whether data has been received from an external device 170 during the discovery time assertion period, $T_{D\text{-}AST}$. If data has been received, processing returns to step 420 where normal operation mode is initiated. If data has not been received, processing proceeds to step 470.

In step 470, host 248 determines whether external radio module 242c should be de-activated. In an embodiment, host 248 prompts a user for an indication of whether the application utilizing the external radio module 242c should be continued.

FIG. 8 depicts a flowchart 800 of a method for coexistence arbitration among multiple wireless modules from the perspective of coexistence arbitration module 244, according to embodiments of the present invention. Flowchart 800 is described with continued reference to the embodiments of FIGS. 1 and 2. However, flowchart 800 is not limited to those embodiments. The steps of flowchart 800 do not necessarily have to occur in the order shown.

In step 810, coexistence arbitration module 244 arbitrates between activated wireless modules (e.g., WLAN module 242a and BT module 242b) using arbitration logic 245.

In step 820, a determination is made whether a medium access request is being asserted by external radio 242c. If the medium access request is asserted, processing proceeds to step 830. If the medium access request is not asserted, processing returns to step 810.

In step 830, the priority of the request from the external radio module 242c is determined. If the priority is LOW, processing proceeds to step 840. This indicates that external radio module 242c is in discovery mode and can be interrupted. If the priority is HIGH, processing proceeds to step 835. When external radio module 242c asserts a request having an associated HIGH priority, the external radio module 242c is given precedence for the antenna regardless of the status of the other modules. This case is illustrated by entries 610 and 620 in FIG. 6.

In step 835, antenna controller 247 switches antenna 249 to external radio module 242c. Processing returns to step 820.

In step 840, a determination is made whether a medium access request is being asserted by one or more additional modules. If no other medium access requests are being asserted, processing proceeds to step 835. This case is illustrated by entry 630 in FIG. 6. If one or more additional medium access requests are received, processing proceeds to step 860.

In step 860, a determination of the priorities of the asserted medium access requests is made. If no HIGH priority signals are asserted, processing proceeds to step 865. This case is represented by entries 640a-c in FIG. 6. If one HIGH priority signal is asserted, processing proceeds to step 880. This case is represented by entries 650a-d in FIG. 6. If two HIGH priority signals are asserted, processing proceeds to step 870. This case is represented by entry 660 in FIG. 6.

In step 865, no modules are asserting a request with a HIGH priority. Accordingly, in this step, arbitration logic 245 arbitrates among external radio module 242c and one or more additional modules asserting a medium access request having LOW priority. Processing returns to step 820.

In step 870, both WLAN module 242a and BT module 242b are asserting medium access requests having a HIGH priority. In this step, arbitration logic 245 determines which module has precedence based on additional criteria such as historical access to the medium and/or transmission characteristics or limitations of the wireless technologies or implementation. Processing returns to step 820.

In step 880, the sole module asserting the HIGH priority request is given precedence for antenna 249. Antenna controller 247 then switches antenna 249 to the module asserting the HIGH priority signal. Processing returns to step 820.

FIG. 9 depicts a flowchart 900 of a method for coexistence arbitration among multiple wireless modules from the perspective of status determination module 246, according to embodiments of the present invention. Flowchart 900 is described with continued reference to the embodiments of FIGS. 1 and 2. However, flowchart 900 is not limited to those embodiments. The steps of flowchart 900 do not necessarily have to occur in the order shown.

In step 910, a determination is made whether a medium access request is being received from external radio module 242c. If a medium access request is received, processing proceeds to step 920. If a medium access request is not received, processing remains at step 910.

In step 920, the priority for the medium access request is set to HIGH and communicated to coexistence arbitration module 244.

In step 930, a determination is made whether the normal assertion time period has elapsed and the medium access request is still being asserted. If the normal assertion time period has elapsed, processing proceeds to step 940. This indicates that the system is in discovery mode of operation and WLAN module 242a or BT module 242b can interrupt external radio module 242c access to the antenna. If the normal assertion time period has not elapsed or the medium access request is not being asserted, processing returns to step 910.

In step 940, the priority of medium access request is set to LOW and communicated to coexistence arbitration module 244.

In step 950, the medium access request is de-asserted by external radio module 242c. In this step, when status determination module 246 stops receiving a medium access request from external radio module 242c, status determination module 246 may de-assert the priority signal.

FIG. 10 depicts a flowchart 1000 of a method for coexistence arbitration among multiple wireless modules from the perspective of the host 248, according to embodiments of the present invention. In flowchart 1000, host 248 modifies the transmission characteristics of one or more devices to increase the chances for detecting data from an external device 170. Flowchart 1000 is described with continued reference to the embodiments of FIGS. 1 and 2. However, flowchart 1000 is not limited to those embodiments. The steps of flowchart 1000 do not necessarily have to occur in the order shown.

In step 1010, host 248 determines that system 200 is operating in discovery mode. For example, host 248 may receive the access requests asserted by modules 242a-c and the priority signals asserted by modules 242a-b and status determination module 246. Based on these inputs, the host identifies that the system is in discovery mode. Alternatively, host 248 may also receive data from external device 170. If host 248 stops receiving this data for a certain time period, host 248 recognizes that the system is in discovery mode.

In step 1020, host 248 determines whether alterations of the transmission characteristics of WLAN module 242a and/or BT module 242b are required. For example, host 248 may cause a reduction in the amount of data sent over the WLAN and/or BT interfaces. For example, the voice quality of the BT link may be degraded to reduce the amount of data sent over the BT connection. The host may also throttle the data throughput of the WLAN and/or BT module. For example, the bit pool of the codec may be dynamically reduced to increase the gaps between Bluetooth transmission slots. This approach trades Bluetooth audio quality for better chanced of detecting data from an external device 170 within a reasonable time period. In a further example, host 248 causes some transactions to be delayed and/or completely stopped. In this example, the host may send an instruction to the WLAN module 242a or BT module 242b to cause the module to cease assertion of a medium access request for a certain time period. Host 248 may also continue to adjust the characteristics throughout the duration of discovery operation.

In step 1030, host 248 sends instructions to WLAN module 242a and/or BT module 242b regarding alterations to their transmission characteristics.

In step 1040, a determination is made whether the time period for discovery operation has elapsed. If the time period has elapsed, operation proceeds to step 1050. If the time period has not elapsed, operation returns to step 1020.

In step 1050, host 248 prompts the user of system 200 to determine whether the user wishes to continue interaction with external device 170.

3.0 CONCLUSION

While various embodiments of the present invention have been described above, it should be understood that they have been presented by way of example, and not limitation. It will be apparent to persons skilled in the relevant arts that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. An apparatus for arbitrating access in a communications device, the apparatus comprising:
    a memory;
    a plurality of wireless modules;
    an arbiter configured to:
        monitor each of the plurality of wireless modules operating at a same frequency;
        determine a precedence for access between access requests from each of the plurality of wireless modules; and
    a status determinator configured to:
        synchronize a first wireless module of the plurality of wireless modules with an external device by limiting data associated with transmission characteristics of other wireless modules of the plurality of wireless modules, the synchronizing performed in response to a comparison between the precedence for access for each of the plurality of wireless modules after the first wireless module asserts a first access request exceeding a predetermined duration.

2. The apparatus of claim 1, wherein the external device includes a sensor configured to periodically transmit data to the plurality of wireless modules.

3. The apparatus of claim 1, wherein the status determinator is further configured to modify the transmission characteristics of the other wireless modules of the plurality of wireless modules.

4. The apparatus of claim 1, wherein the arbiter is further configured to arbitrate among the plurality of wireless modules for access to a shared station medium by using historical data related to recent use of the shared station medium.

5. The apparatus of claim 1, wherein the status determinator includes a user application that monitors and measures data provided by the external device.

6. The apparatus of claim 1, wherein the status determinator is further configured to:
    receive data from the external device; and
    transmit the data to the first wireless module while blocking access of the other wireless modules of the plurality of wireless modules.

7. The apparatus of claim 1, wherein the arbiter is further configured to:
    modify the precedence among the plurality of wireless modules based on a duration of time or a change in priority among the plurality of wireless modules.

8. The apparatus of claim 1, wherein the arbiter is further configured to:
    modify the precedence among the plurality of wireless modules based on a failure of the external device to provide data to a host application.

9. A method of arbitrating access in a communications device including a status determination module communicatively coupled to a plurality of wireless modules, the method comprising:
    monitoring each of the plurality of wireless modules operating at a same frequency;
    determining a precedence for access between access requests from each of the plurality of wireless modules; and
    synchronizing a first wireless module of the plurality of wireless modules with an external device by limiting data associated with transmission characteristics of other wireless modules of the plurality of wireless modules, the synchronizing performed in response to a comparison between the precedence for access for each of the plurality of wireless modules after the first wireless module asserts a first access request exceeding a predetermined duration.

10. The method of claim 9, wherein the external device is a sensor configured to periodically transmit data to a user application that monitors and measures data provided by the external device.

11. The method of claim 9, further comprising:
    modifying the transmission characteristics of the other wireless modules of the plurality of wireless modules.

12. The method of claim 9, further comprising:
    arbitrating among the plurality of wireless modules for access to a shared station medium by using historical data related to recent use of the shared station medium.

* * * * *